Dec. 26, 1950     T. J. GORMAN, JR     2,535,676
BAIL FOR CANS
Filed Sept. 29, 1947

INVENTOR,
Thomas J. Gorman Jr.
BY
E. E. Vrooman & Co.,
ATTORNEYS.

Patented Dec. 26, 1950

2,535,676

UNITED STATES PATENT OFFICE 2,535,676

BAIL FOR CANS

Thomas J. Gorman, Jr., Newark, N. J.

Application September 29, 1947, Serial No. 776,722

1 Claim. (Cl. 220—95)

This invention relates to a bail for cans.

An object of the invention is the production of an efficient bail which will not accidentally be displaced off the can when once positioned thereon.

Another object of invention is the construction of a bail with novel and efficient means placed within the ears of the can whereby the more strain placed on the bail, the more securely the bail will be held on the can.

A still further object of the invention is the construction of a novel and efficient bail which can be easily assembled with a can and which will give efficient results during the life of the can and bail.

This invention relates to certain improvements over the many disclosures in my prior Patent No. 2,176,711, October 17, 1939, "Means for Attaching Bails to Cans."

With the foregoing and other objects in view, my invention comprises certain novel constructions, combinations, and arrangements of parts as will be hereinafter fully described, illustrated in the accompanying drawings, and more particularly pointed out in the appended claims.

Figure 1:
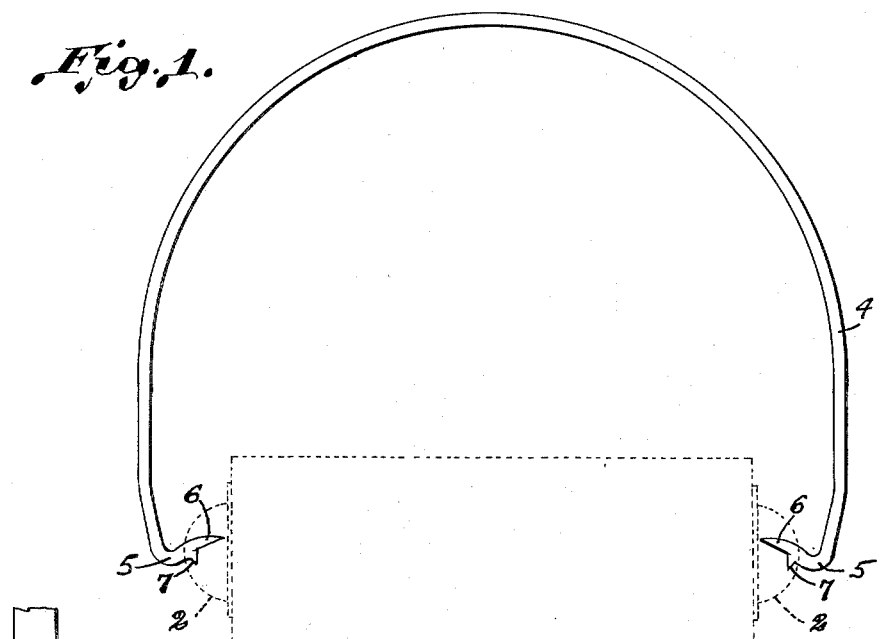
Fig. 1 is a view in side elevation of a bail constructed in accordance with the present invention, with the can and ears thereof shown in dotted lines.

Referring to the drawings, in which the preferred embodiment of this invention is illustrated, 1 designates a can, which may be a paint can or the like. This can 1 is provided with two ears 2. Each ear is provided with an opening or slot 3.

A bail 4 is provided on each end with an upwardly curved arm 5, which arm has at its outer end an extension constituting a long straight, horizontal finger 6. Finger 6 is preferably pointed at its outer end for better engagement with the can 1 when the can is lifted through the operator grasping the bail 4. The bail 4 is preferably formed of suitable wire and the depending V-shaped barb or spur 7 is cut from the body of the curved arm 5 and finger 6. It is to be noted that the depending V-shaped spur 7 is a considerable distance from the outer end of the finger portion 6 of the bail 4. The advantage of this peculiar structure will be hereinafter pointed out.

The slot 3 is of sufficient elongation to permit ready insertion of the finger 6 and spur 7 into the ear 2, in each instance.

Figure 2:
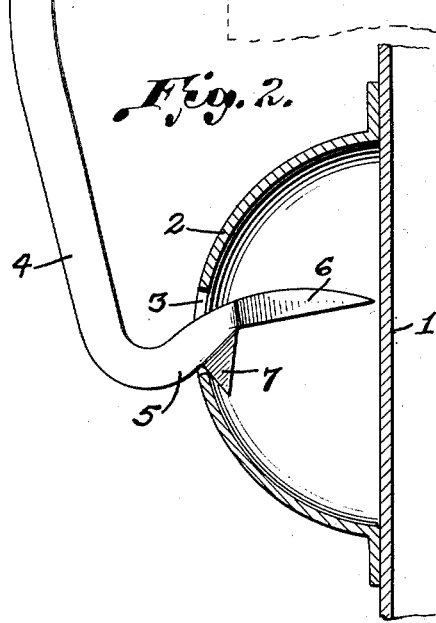
Fig. 2 is an enlarged, fragmentary view of the bail and can, showing particularly the bail in its normal position when the end is in the ear of the can.
Figure 3:
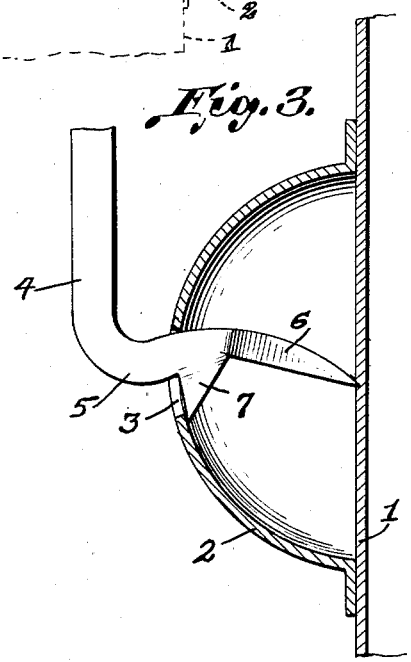
Fig. 3 shows the position of the end of the bail in the ear when strain is placed upon the bail, such as occurs when lifting a filled or loaded can.
Figure 4:
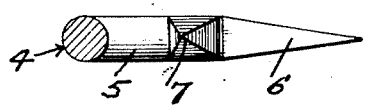
Fig. 4 is an enlarged, fragmentary, bottom plan view of the bail.

When the bail 4 has been positioned upon the ears 2 as shown, the bail will normally rest as shown in Fig. 2. The V-shaped barb or spur 7 will obviously keep the bail from being displaced as it bears, in each instance, against the rim of the slot 3 of the ear 2. When the operator lifts the can the weight thereof causes the bail 4 to assume the position shown in Fig. 3, whereupon the depending V-shaped spur 7 would be bearing against the inner face of the ear 2, acting as a fulcrum, with the finger 6 biting into the body of the can 1, as shown in Fig. 3. This produces a tight lock, as well as an efficient one, for retaining the bail 4 against accidental displacement off the can 1. This improved structure is a decided one over the disclosure in my prior patent No. 2,176,711, hereinbefore specified.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

In a device of the character described, in combination, a can, ears having apertures therein diametrically opposed and extending outwardly on said can, and a bail, having inwardly projecting end portions extending through said apertures into said ears, said end portions comprising elongated fingers terminating in sharp points at their inner extremities and having downwardly extending V-shaped spurs formed thereon at a point adjacent said apertures, the distance from each sharp point to the remote side of the respective spur being slightly greater than the distance of the open portion of each ear from the can, whereby upon lifting said can by said bail said spurs act as fulcrums against said outwardly extending ears causing the points of said fingers to bite into said can.

THOMAS J. GORMAN, Jr.

REFERENCES CITED

The following references are of record in the file of this patent:

UNITED STATES PATENTS

| Number | Name | Date |
|---|---|---|
| 181,286 | Sears | Aug. 22, 1876 |
| 1,024,841 | Emery | Apr. 30, 1912 |
| 1,869,348 | Rollason | July 26, 1932 |
| 2,176,711 | Gorman, Jr. | Oct. 17, 1939 |